US012163367B2

(12) United States Patent
Fejer

(10) Patent No.: US 12,163,367 B2
(45) Date of Patent: Dec. 10, 2024

(54) WINDOW, ESCAPE HATCH OR A DOOR COMPRISING A CHAIN SUPPORT MECHANISM

(71) Applicant: WindowMaster International A/S, Vedbæk (DK)

(72) Inventor: Ole Fejer, Copenhagen S (DK)

(73) Assignee: WINDOWMASTER INTERNATIONAL A/S, Vedbæk (DK)

( * ) Notice: Subject to any disclaimer, the term of this patent is extended or adjusted under 35 U.S.C. 154(b) by 0 days.

(21) Appl. No.: 18/378,190

(22) Filed: Oct. 10, 2023

(65) Prior Publication Data

US 2024/0125163 A1 Apr. 18, 2024

(30) Foreign Application Priority Data

Oct. 12, 2022 (DK) .......................... PA 2022 70498

(51) Int. Cl.
*E05F 15/619* (2015.01)

(52) U.S. Cl.
CPC ....... *E05F 15/619* (2015.01); *E05Y 2201/656* (2013.01); *E05Y 2600/41* (2013.01); *E05Y 2600/45* (2013.01)

(58) Field of Classification Search
CPC ..... E05F 15/619; F16G 13/20; F16H 19/0636
See application file for complete search history.

(56) References Cited

U.S. PATENT DOCUMENTS

| | | | | |
|---|---|---|---|---|
| 1,862,860 A * | 6/1932 | Morse | E05F 15/627 | 49/358 |
| 1,878,796 A * | 9/1932 | Morse | E05F 15/643 | 49/108 |
| 2,832,590 A * | 4/1958 | Youngberg | E05F 11/06 | 74/424.6 |

(Continued)

FOREIGN PATENT DOCUMENTS

| | | | |
|---|---|---|---|
| CH | 714546 A2 * | 7/2019 | E04D 13/0358 |
| CN | 114370210 A * | 4/2022 | |

(Continued)

OTHER PUBLICATIONS

Danish Search Report for Application No. PA 2022 70498 completed on Mar. 7, 2023.

*Primary Examiner* — Catherine A Kelly
(74) *Attorney, Agent, or Firm* — Schmeiser, Olsen & Watts LLP

(57) ABSTRACT

A chain support mechanism for use with an openable frame component and a method of using such a chain support is provided, where a chain actuator is provided in a housing, the chain actuator including a push-pull chain which chain can bend in one direction only, the housing mounted with its longitudinal extent along one frame component with the chain attached to the openable frame component where the chain actuator may be manipulated to extend or withdraw the chain from the housing, thereby moving the openable frame component, and where the chain support mechanism includes a first arm pivotably fastened to the housing and a (Continued)

second arm pivotably fastened to the openable frame component, where the distal end of the first arm and the distal end of the second arm are pivotably connected by a sliding member, against which sliding member the chain may slide.

12 Claims, 2 Drawing Sheets

(56) References Cited

U.S. PATENT DOCUMENTS

| | | | | | |
|---|---|---|---|---|---|
| 4,014,136 | A * | 3/1977 | Hemens | F16G 13/20 74/606 R |
| 4,481,735 | A * | 11/1984 | Jentoft | E05F 11/06 49/325 |
| 4,827,668 | A * | 5/1989 | Bechtold | E05F 11/06 74/424.6 |
| 5,015,022 | A * | 5/1991 | McGuire | E05B 65/0888 292/278 |
| 5,271,182 | A * | 12/1993 | Greisner | E05F 15/619 49/325 |
| 6,405,486 | B1 * | 6/2002 | Rogers, Jr. | E05F 15/619 49/340 |
| 8,567,125 | B2 * | 10/2013 | Sorensen | F16G 13/06 49/324 |
| 10,137,785 | B2 * | 11/2018 | Vahle | F16G 13/20 |
| 11,248,684 | B2 * | 2/2022 | Tchatchoua | F16H 19/0645 |
| 11,454,304 | B2 * | 9/2022 | Wolf | F16H 19/0636 |
| 2011/0302843 | A1 * | 12/2011 | Dallmann | E05F 15/627 49/358 |

FOREIGN PATENT DOCUMENTS

| | | | | | |
|---|---|---|---|---|---|
| DE | 29816102 | U1 | | 12/1998 | |
| DE | 202006014591 | U1 | * | 12/2006 | E05F 11/06 |
| DE | 202007000531 | U1 | * | 4/2007 | E05F 11/06 |
| DE | 202006008411 | U1 | * | 8/2007 | E05F 15/619 |
| DE | 102016110950 | B3 | * | 9/2017 | B66F 13/005 |
| DE | 102021200593 | B3 | * | 6/2022 | E05F 11/06 |
| EP | 1764469 | A1 | * | 3/2007 | E05C 9/185 |
| EP | 2385184 | A1 | * | 11/2011 | E04D 13/0358 |
| EP | 2386781 | A1 | * | 11/2011 | E05F 11/06 |
| EP | 3505712 | A1 | * | 7/2019 | |
| FR | 1 380 712 | A | | 12/1964 | |
| JP | H09125845 | A | * | 5/1997 | |
| WO | 2005/033455 | A1 | | 4/2005 | |

* cited by examiner

WINDOW, ESCAPE HATCH OR A DOOR COMPRISING A CHAIN SUPPORT MECHANISM

CROSS-REFERENCE TO RELATED APPLICATIONS

This application claims priority to Danish Application No. PA 2022 70498, having a filing date of Oct. 12, 2022, the entire contents of which are hereby incorporated by reference.

FIELD OF TECHNOLOGY

The following concerns a window, escape hatch or a door comprising a chain support mechanism and a method of opening an openable frame component relative to a frame using a chain actuator using a chain support mechanism. The chain support mechanism is used for supporting chains used in chain actuators.

BACKGROUND

Chain actuators are for example used for opening and closing windows and doors. One end of the chain is connected to an openable frame component, and as the actuator is activated the chain extends from the chain actuator mechanism, thereby pushing the openable frame component away from the stationary part of the frame onto which the chain actuator is normally mounted.

Special chain constructions are used. A chain is typically constructed by two parallel rows of overlapping chain plates. The chain plates are provided with two holes each. By overlapping holes in adjacent chain plates in each row, and laterally connecting these overlapping holes by pins, a flexible chain is constructed. The chain will be able to bend/flex around the pins, meaning that the chain will flex in the plane of the chain plates, but be stiff—not able to flex sideways—orthogonal to the plane of the chain plates.

A special type of chain are the chains which may only bend in one direction. This may for example be achieved by providing adjacent chain plates with abutting end surfaces, having a rounded section and a straight section. When the chain is attempted to bend such that the straight end surfaces abut, this will resist the bending action, render the chain in that bending direction. At least within this application this direction will be referred to as the non-bendable direction.

In the present instance a flexible chain is provided which is connected at one end of the free-swinging edge of the window sash and which at its other end may be coiled up in a relatively small casing mounted upon the window sill. This chain is flexible in one direction only so that, when held against flexing in this direction, it will be rigid and will serve as a means both to push the window open and to pull it closed. The chain as shown is made up of a plurality of links or segments held together by pivot pins about which the links may move in one direction. For convenience these pivot pins are extended from the surface of the chain.

The chains used in these types of chain actuators may be defined as having a longitudinal direction and being non-bendable in three directions.

A problem with the push-pull chains is that they are flexible in one direction. This fact has some advantages in that it is possible to curl the chain when being stored in the housing, whereby storage of the chain only requires a relatively small volume compared to the potential length of the extended chain. However, as the chain extends, a push of the chain in the direction in which it is allowed to flex may cause the entire chain to collapse. This may cause the openable frame component to swing back and thereby close the opening (window, door, escape exit/hatch or other opening) unintentionally. It is clear that the further the chain is extended from the housing, i.e., the longer the free span of the chain is, the more "fragile" it becomes. Also, if the openable component is exposed to other forces such as for example wind, the compressive forces in the chain pushing the frame open, may disappear for a short while, render the chain slack and thereby also prone to collapse.

In order to mitigate this undesired effect, it has in the conventional art been attempted to provide chain supports.

One example is disclosed in DE29816102U1 which discloses a construction which may be a window, an escape hatch, or a door. The construction comprises a frame and an openable frame interconnected by a hinge; a chain support mechanism; a housing; and a chain actuator in the housing. The chain actuator comprises a push-pull chain which chain can bend in one direct ion only. The housing is mounted with its longitudinal extent along one frame component of the frame. The chain is attached to the openable frame. The chain actuator may be manipulated to extend or withdraw the chain from the housing, thereby moving the openable frame. The chain support mechanism comprises a first arm fastened to the housing, where the distal end of the first arm is connected to a sliding member, against which sliding member the push-pull chain slide.

The chain support is typically arranged near the chain's exit opening in the housing and only extends a short distance from the housing. It is clear that such support and guide means will urge the chain against the flexible direction of the chain as the chain exits the housing, thereby lessening the chain's tendency to bend. However, for larger openings the length of the chain will be substantial compared to the extent of the chain support, and therefore the chain support's effect will be minimal, particularly in situations where the chain accidentally is urged towards the flexible direction of the chain. In these circumstances the chain will collapse, and the opening frame member be able to move towards a closed position. The situations where this accidental urging of the chain in the chain's flexible direction may be unintended touching by a person, a wind-gust relaxing the tension in the chain for a short period of time, malfunction in the motor causing erratic movement etc.

SUMMARY

An aspect relates to a chain support which may support the chain even when the opening angle is large, for example more than 60 degrees, and still allow the openable frame to move unhindered from the fixed part of the frame.

Embodiments of the present invention address this need by providing a window, escape hatch or a door which each comprises a frame and an openable frame pivotably connected by a hinge, where a chain support mechanism for use with the openable frame is provided and where a chain actuator is provided in the housing, the chain actuator comprising a push-pull chain which chain can bend in one direction only, the housing is mounted with its longitudinal extent along one frame component of the frame with the chain attached to the openable frame where the chain actuator may be manipulated to extend or withdraw the chain from the housing, thereby moving the openable frame, and where the chain support mechanism comprises a first arm pivotably fastened to the housing and a second arm pivotably fastened to the openable frame, where the distal end of the first arm and the distal end of the second arm are pivotably connected by a sliding member, against which sliding member the chain may slide.

Traditionally the opening mechanism is enclosed in a housing. The housing may be incorporated or be part of a frame component, not intended to move. The non-moving frame component is in pivotal connection with an openable frame component. Where a separate housing is provided, the housing may be fastened to the frame component.

Typically, the housing has a longitudinal extent and dimensions allowing the housing to be mounted in an unobtrusive manner to the frame component. The housing has an opening through which the push-pull chain extends, which chain is connected to the openable frame component. In the closed position of the frame components (i.e., the window or other opening is closed) the first and second arms are collapsed and stored alongside the housing. The fact that the distal ends of the first and second arms are connected, and the connection is slidable along the chain allows for the arms to completely collapse and be positioned parallel to the housing. As the openable frame is pivoted from a closed position, the second arm will be pulled together with the openable frame. As the distal end of the second arm is connected to the distal end of the first arm, the first arm will also be made to follow the movement of the openable frame member. As the connection point between the first and second arm is sliding on the chain and being guided by the chain, the movements of the first and second arms will be determined by the chain. The guiding means will at the same time hinder the chain in collapsing, as the first and second arms will provide a rigid support, maintaining the chain in a fixed relationship due to the sliding connection between the distal ends of the first and second arms. At the same time, since the second arm is fastened to the openable frame component the guiding member will be maintained approximately at half the extended length of chain. This relationship between the sliding member's position and the length of the chain may be determined by positioning the pivot points of the first and second arms respectively on the openable and non-movable frame members. Likewise, the relative lengths of the first and second arms will also influence the position of the sliding member on the chain during the extension of the chain.

The chain support may be in the shape of a roller arranged to roll on the bendable side of the chain, or even two rollers—one arranged on either side of the chain. The second roller is provided either on the first arm or the second arm, the second roller is arranged at a distance from the first roller towards the pivoting fastening points of either the first arm or the second arm, such that the chain may slide between the first and second rollers. In this manner a nearly frictionless support is provided, and as the rollers are provided with axles, they are fixed relative to the first and second arms, and therefore retains the chain in the desired position.

A further advantage of having the sliding member urging the chain out of a direct line between the chain's exit in the housing and the attachment point to the openable member, is the fact that less force is needed in order to close the openable frame member again. This is particularly outspoken with wide openings, i.e., more than 100 degrees and particularly for openings close to 180 degrees. For example, if the openable member is opened approx. 180 degrees, the openable frame will be flush with the surface in which the frame and openable frame is mounted, and the chain will be parallel to the surface. When activating the motor to close the openable frame, there is no force component moving the frame away from the surface. The chain will only exert a force parallel to the surface. However, with embodiments of the present invention the position of the sliding member will always provide that the chain is not parallel to the surface, and as such a (substantial) force component away from the surface will be present. Therefore, the necessary force to close the openable frame may be drastically reduced.

In a still further embodiment of the invention a third arm is provided, the third arm having a first end and a second end, where the first end is provided with a third roller in the shape of a chain guide member arranged pivotably fastened to the first arm, and where the second end is pivotably connected to a movable chain guide member arranged in the opening in the housing from which the chain extends, which chain guide member remains in constant contact with the non-bending side of the chain during the extension/retraction of the chain from the housing.

As the third arm is connected to the first arm, opening of the openable frame component relative to the frame caused by extending the chain will also pivot the first arm relative to the frame. This movement causes the third arm to be displaced. As the third arm is connected to the chain guide member, this member will also be moved. In practice the guide member is arranged in the housing such that it may rotate around the sprocket wheel which engages the chain. The sprocket wheel's engagement and rotation will cause the chain to either extend or retract depending on the rotation direction of the sprocket wheel. As the guide member rotates around the sprocket wheel, it will remain in contact with the non-bendable side of the chain due to the urging from the displacement of the third arm. Thereby the chain will be urged against its bendable direction and therefore be more stable.

As an alternative to the third arm-construction a chain guide member is provided, the chain guide member being biased against the non-bending side of the chain, such that as the chain's direction relative to the housing changes due to the openable frame component's pivoting movement, the chain guide member will remain in biased contact with the chain. The biasing force may be provided by a spring (mechanical or gas spring) and may be arranged in the housing. However, the biasing force exerted by the spring, i.e., the guide member being biased against the non-bending side of the chain, is designed to urge the chain towards the non-bending direction in the same manner as the embodiment described above.

The push-pull chain is constructed by having two parallel sides separated by a gap, where each side consists of overlapping plate links, mutually connected by pins. In this manner the pins act as axles around which the plate links may pivot. The pins also connect the mutually overlapping plate links on the other side of the chain. Thereby is created a gap between the parallel rows of plate links. In embodiments where a roller is provided in the connection between the first and second arms, the first roller has a guide part which in use extends into the gap between the two parallel sides of the push-pull chain. In embodiments where a guide member is provided instead of the rollers the sliding member is a bushing surrounding the chain, where the bushing is shaped to have a section slidably engaging the gap between adjacent sides of the chain.

The push-pull chain is as described above constructed by having two parallel sides separated by a gap, where each side consists of overlapping plate links. In order to provide the non-bending property in one direction the plate links may in for example the upper portion be provided with straight 90 degrees corners and in the lower portion with rounded corners. When two straight 90 degrees corners abut, the plate links will abut and hinder bending, whereas when two rounded corners are moved towards each other they will allow bending.

In a further advantageous embodiment, the first arm and the openable frame component are arranged within an angle of +/−10 degrees relative to being parallel where the second arm and the longitudinal extent of the housing are arranged within an angle of +/−10 degrees relative to being parallel. Within these relative arrangements of the arms and frame components it is assured that a trouble-free working of the mechanism is achieved.

In a still further embodiment, the chain support mechanism may be retrofitted to already installed openable sash and frame constructions.

Embodiments of the invention may be used where the openable frame component is pivotably one-sided hinged off-set from the chain such that the chain in use leaves the housing at an oblique angle relative to the longitudinal extent of the housing.

Particularly when opening the openable frame component wide for example in escape hatches, doors or windows the chain actuators may become unstable due to the angle of the chain relative to the housing. The chain remains relatively stable as long as it is exposed to compression in the chain's longitudinal direction. If the pressure lessens, it may become unstable. In order to improve the properties when the opening angle α between the openable frame component and the longitudinal extent of the housing is close to or exceeds 90 degrees, the sliding member urges the chain out of a linear configuration by bending the chain in the chain's bending direction at the sliding member's point of contact with the chain. Thereby the chain's span is divided in two sections, where each section has a greatly increased stability, and the risk of collapse due to the chain being forced in the bendable direction is limited.

BRIEF DESCRIPTION

Some of the embodiments will be described in detail, with references to the following Figures, wherein like designations denote like members, wherein.

DETAILED DESCRIPTION

Figure 1:
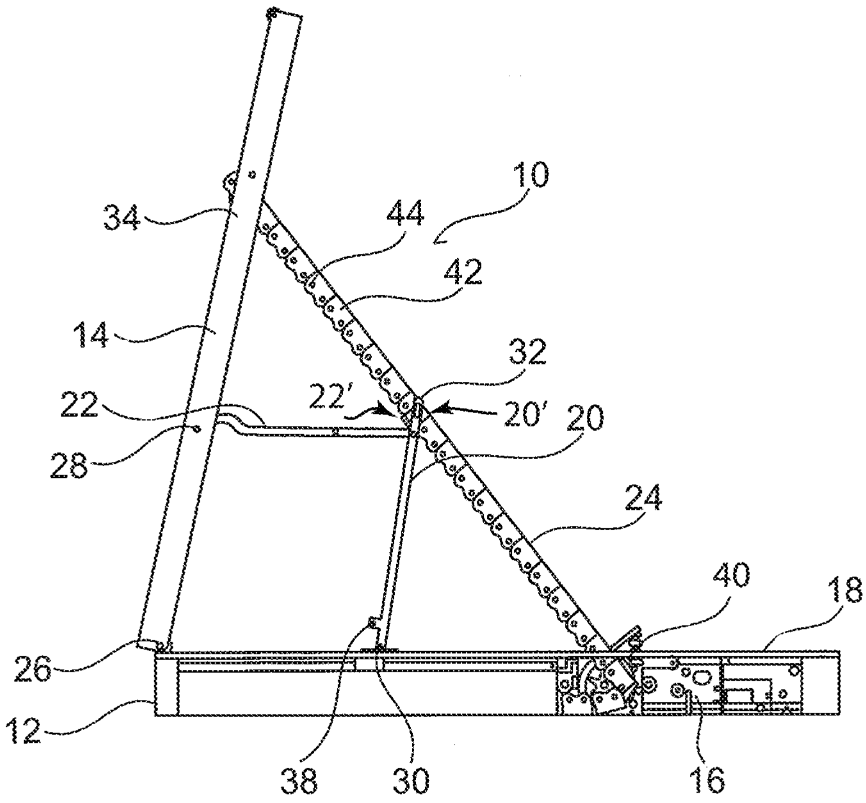
FIG. 1 illustrates the principle of the chain support mechanism, mounted in an openable frame construction.

The chain support mechanism 10 is arranged between a frame member 12 and an openable frame component 14. In this embodiment the chain actuator mechanism 16 is integrated in the stationary frame 12 which acts as the chain actuator's housing. The chain actuator mechanism 16 may also be provided with its own housing being fastened to the frame, as a separate component—not illustrated. In FIG. 1 the housing 18 is integrated in the frame.

The mechanism in this embodiment comprises a first arm 20 pivotably fastened to the stationary frame 12/housing 18. A second arm 22 is pivotably fastened to the openable frame component 14. The distal ends 20', 22' are fastened adjacent the push-pull chain 24. The lengths of the arms 20, 22 and the relative fastening points of the arms on the respective frame parts is determined/selected in order for the arms and frame components to form almost a parallelogram. Tests during development has indicated that a substantially flawless operation of the mechanism 10 may be achieved when the arms and frame components are arranged substantially as a parallelogram.

However, other relationships between arms and frame components will also work. The mechanism 10 functions in the following manner: as the openable frame member 14 is being pivoted around a hinge 26 the chain 24 extends from the housing 18, pushing the movement of the frame component 14. At the same time due to the pivotable fastening 28 of the second arm 22 to the frame component 14, the second arm is pulled relative to the housing 18. As the second arm 22 is connected to the first arm 20 in their respective distal ends 20',22', the first arm will also be moved—pivoted around the fastening point 30. Due to the relative lengths between the first and second arms 20, 22 and the sliding engagement with the chain 24 of their distal ends united in a sliding member 32, the sliding member will slide along the chain 24 and support the chain somewhere between the housing 18 and the chain's fastening point 34 on the openable frame component 14. As the openable frame component 14 is pivoted further away due to being pushed by the chain 24, the sliding member 32 will likewise be slid further along the chain.

Figure 4:
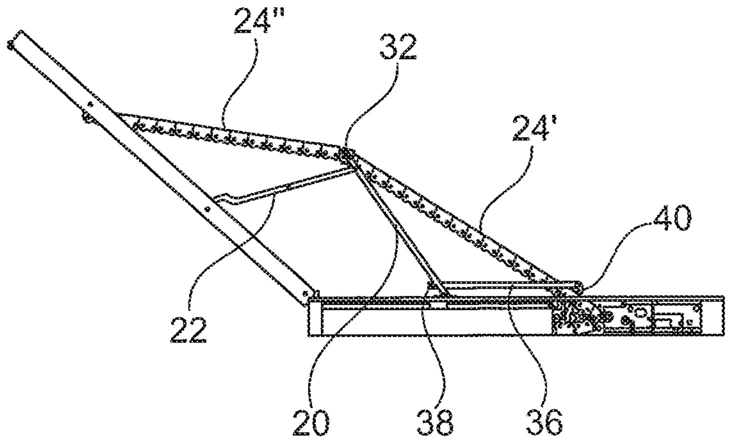
FIG. 4 illustrates a situation where an opening angle is approx. 120 degrees.

At the same time a third arm 36, see FIG. 4, which is pivotably fastened in a pivot point 38 to the first arm 20, will also move. The third arm 36 being pivotably connected to a chain guide member will cause the chain guide member 40 to be rotated, such that a section 42 of the guide member remains in contact with the chain 24, urging the chain in the non-bendable direction. The section 42 extends a short distance out of the housing 18 and thereby supports the chain as the chain 24 exits the housing 18.

Figure 2:
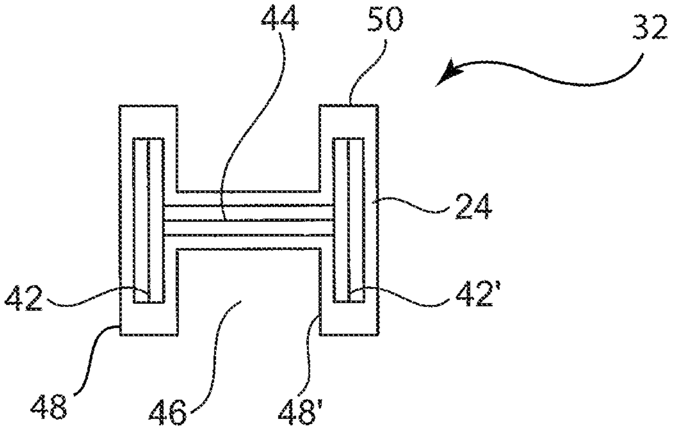
FIG. 2 illustrates a detail of the guiding member interacting with the chain.

In FIG. 2 is illustrated an example (cross-section) of a sliding member 32. In this embodiment the sliding member is a short bushing 40, surrounding the chain 24. The chain 24 is conventionally constructed by two parallel rows 42, 42' of overlapping link plates, which are interconnected by pins or axles 44. Between the two parallel rows of chain link plates 42, 42' is defined a gap 46. The bushing 40 is designed to have one or two sections 48, 48' bend, fitting inside the gap 46. In this manner the bushing 40 is slidingly held by the chain.

Figure 3:
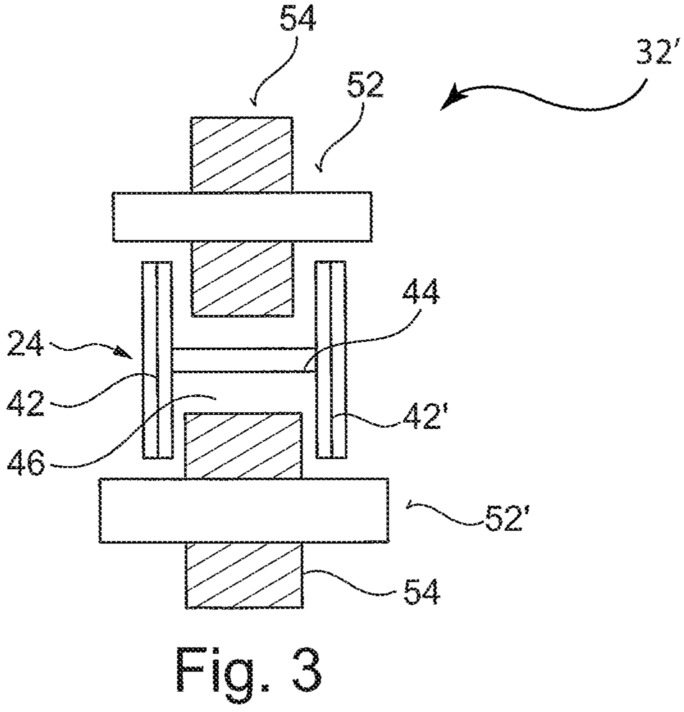
FIG. 3 illustrates a detail of the guiding member interacting with the chain.

Alternatively, when the sliding member is in the shape of rollers, see FIG. 3, the rollers 52, 52', may have a section 54 with enlarged diameter fitting inside the gap 46. In this manner the rollers 52, 52' may slidingly guide the chain 24.

Turning to FIG. 4 an open position is illustrated where the opening angle is approx. 120 degrees. In this embodiment the mechanism is provided with a third arm 36 as already discussed above. As may be seen, the arms 20, 22 have in this position “lifted” the chain 24 out of a straight line, by forcing the chain to bend at the sliding member's 32 position. Hereby is achieved that the chain 24 is effectively divided in two sections 24', 24". As these sections 24', 24" are shorter than the overall extended chain length and they are held by the guiding member 32 in a position where the bendable direction of the chain 24 is fixed, the risk of collapse is greatly minimized. The illustrated situation with the wide opening may occur in a number of circumstances, and embodiments of the invention by its construction presents a safer opening mechanism than what can be achieved with traditional push-pull actuators.

A further advantage of lifting the chain out of a straight line between the exit from the housing and the attachment point to the openable frame member, is the fact that less force is needed in order to close the openable frame member again.

FIG. 4 also illustrates a situation where the openable frame is opened approx. 120 degrees with respect to the surface (not illustrated but parallel to the longitudinal extent of the housing) into which the frame and openable frame is arranged. If the chain had not been lifted out of the straight line, a substantial force will be needed in order to close the openable frame component. This is due to the relative angles between the pulling direction and the chain's angle of attack. The resulting force component perpendicular to the longitudinal direction of the openable frame component needed for pulling the openable frame component, making it pivot around the hinge is very small. However, by lifting the chain out of a straight line between the chain's exit aperture in the housing and the attachment point to the openable frame, the force component perpendicular to the longitudinal extent of the openable frame component increases drastically. This in turn provides the advantage that a smaller motor may be used.

The above situation becomes even worse if the openable frame is opened close to 180 degrees (the openable frame component being substantially parallel to the longitudinal extent of the housing). In this position it will be impossible—regardless of the force of the motor to pivot the openable frame component, as there is no force component perpendicular to the openable frame component. By lifting the chain as discussed above, there will be created a force component, and the openable frame component may be closed again.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A window, escape hatch or a door which each comprises a frame and an openable frame pivotably connected by a hinge, where a chain support mechanism for use with the openable frame is provided and where a chain actuator is provided in a housing, the chain actuator comprising a push-pull chain where the chain can bend in one direction only, the housing is mounted with its longitudinal extent along one frame component of the frame with the chain attached to the openable frame where the chain actuator may be manipulated to extend or withdraw the chain from the housing, thereby moving the openable frame, wherein the chain support mechanism comprises a first arm pivotably fastened to the housing and a second arm pivotably fastened to the openable frame, where the distal end of the first arm and the distal end of the second arm are pivotably connected by a sliding member, against which the chain may slide.

2. The window, escape hatch or a door according to claim 1, wherein the sliding member comprises a first roller arranged on a non-bendable side of the chain.

3. The window, escape hatch or a door according to claim 2, wherein a second roller is provided either on the first arm or the second arm, the second roller is arranged at a distance from the first roller towards the pivoting fastening points of either the first arm or the second arm, such that the chain may slide between the first and second rollers.

4. The window, escape hatch or a door according to claim 1, wherein a third arm is provided, the third arm having a first end and a second end, where the first end is provided with a third roller in the form of a chain guide member arranged to be able to slide or roll along the first arm, and where the second end is pivotably connected to a movable chain guide member arranged in the opening in the housing wherefrom the chain extends, the chain guide member is in constant contact with a non-bending side of the chain during the extension or retraction of the chain from the housing.

5. The window, escape hatch or a door according to claim 1, wherein a chain guide member is provided, the chain guide member being biased against a non-bending side of the chain, such that as a direction of the chain relative to the housing changes due to the pivoting movement of the openable frame, the chain guide member will remain in biased contact with the chain.

6. The window, escape hatch or a door according to claim 1, wherein the chain is constructed by having two parallel sides separated by a gap, where each side consists of overlapping plate links, mutually connected by pins, the pins also connects the mutually overlapping plate links on the other side of the chain, and where the sliding member comprises a first roller, the first roller has a guide part which in use extends into the gap between the two parallel sides of the push-pull chain.

7. The window, escape hatch or a door according to claim 1, wherein the chain is constructed by having two parallel sides separated by a gap, where each side consists of overlapping plate links, mutually connected by pins, the pins also connect the mutually overlapping plate links on the other side of the chain, where the sliding member is a bushing surrounding the chain, where the bushing is shaped to have a section slidably engaging the gap between adjacent sides of the chain.

8. The window, escape hatch or a door according to claim 1, wherein the first arm and the openable frame are arranged within an angle of +/−10 degrees relative to being parallel and where the second arm and the longitudinal extent of the housing are arranged within an angle of +/−10 degrees relative to being parallel.

9. The window, escape hatch or a door according to claim 1, wherein the chain support mechanism may be retrofitted to already installed openable sash and frame constructions.

10. The window, escape hatch or a door according to claim 1, wherein the openable frame is pivotably one-sided hinged off-set from the chain such that the chain in use leaves the housing at an oblique angle relative to the longitudinal extent of the housing.

11. The window, escape hatch or a door according to claim 1, wherein when an opening angle between the openable frame and the longitudinal extent of the housing is close to or exceeds 90 degrees, the sliding member urges the chain out of a linear configuration by bending the chain in the chain's bending direction at a point of contact of the sliding member with the chain.

12. A method of opening a window, escape hatch or a door where a hinge pivotably connects an openable frame to a fixed frame according to claim 1 comprising:

installing the chain support mechanism between the openable frame and the fixed frame;

extending the chain from the housing when a push-pull chain actuator is activated;

rotating the openable frame away from the fixed frame; and urging the chain with the sliding member out of a straight line between an exit aperture in the housing for the chain and the attachment point of the chain to the openable frame.

* * * * *